(12) United States Patent
Schoenke et al.

(10) Patent No.: US 10,851,791 B2
(45) Date of Patent: Dec. 1, 2020

(54) CONTACTLESS MAGNETIC COUPLINGS FOR MICROFLUIDIC DEVICES AND NAUTICAL PROPULSION

(71) Applicant: Okinawa Institute of Science and Technology School Corporation, Okinawa (JP)

(72) Inventors: Johannes Richard Schoenke, Okinawa (JP); Eliot Martin Fried, Okinawa (JP)

(73) Assignee: Okinawa Institute of Science and Technology School Corporation, Okinawa (JP)

( * ) Notice: Subject to any disclaimer, the term of this patent is extended or adjusted under 35 U.S.C. 154(b) by 399 days.

(21) Appl. No.: 15/846,565

(22) Filed: Dec. 19, 2017

(65) Prior Publication Data
US 2018/0172007 A1    Jun. 21, 2018

Related U.S. Application Data

(60) Provisional application No. 62/436,392, filed on Dec. 19, 2016.

(51) Int. Cl.
*F04D 13/02* (2006.01)
*B63H 23/22* (2006.01)
(Continued)

(52) U.S. Cl.
CPC .......... *F04D 13/027* (2013.01); *B63H 23/22* (2013.01); *H02K 49/102* (2013.01);
(Continued)

(58) Field of Classification Search
CPC ...... H02K 49/102; B63H 23/22; F04D 13/027
See application file for complete search history.

(56) References Cited

U.S. PATENT DOCUMENTS 5,195,877 A   3/1993   Kletschka
6,007,309 A   12/1999  Hartley
(Continued)

OTHER PUBLICATIONS

Schonke et al., "Smooth Teeth: Why Multipoles Are Perfect Gears", Physical Review Applied, Physical Review, 4, 064007 (2015).
(Continued)

*Primary Examiner* — Nathaniel E Wiehe
*Assistant Examiner* — John S Hunter, Jr.
(74) *Attorney, Agent, or Firm* — Westerman, Hattori, Daniels & Adrian, LLP

(57) ABSTRACT

A device for moving a fluid with magnetic gear includes two first balls each having a shape of sphere, respectively fixed to a rotating first shaft through respective centers of the sphere, each of the first balls having a first magnetic dipole in a direction orthogonal to the first shaft; and a second ball having a shape of sphere attaching a blade structure thereon to move the fluid, fixed to a freely rotatable second shaft through a center of the sphere, and having a second magnetic dipole in a direction orthogonal to the second shaft, wherein the centers of the first and second balls altogether form an isosceles triangle with a vertex angle $\psi$ being defined about the center of the second ball, satisfying $$\psi = 2\arcsin\left(\frac{1}{\sqrt{3}}\right) \approx 70.53°.$$

13 Claims, 15 Drawing Sheets

(51) Int. Cl.
*H02K 49/10* (2006.01)
*F04D 29/043* (2006.01)
*B63G 8/00* (2006.01)
*B64C 39/02* (2006.01)

(52) U.S. Cl.
CPC ...... *B63G 2008/004* (2013.01); *B64C 39/024* (2013.01); *F04D 29/043* (2013.01)

(56) References Cited

U.S. PATENT DOCUMENTS

| | | | |
|---|---|---|---|
| 6,015,272 | A | 1/2000 | Antaki et al. |
| 6,447,266 | B2 | 9/2002 | Antaki et al. |
| 6,506,025 | B1 | 1/2003 | Gharib |
| 6,527,521 | B2 | 3/2003 | Noda |
| 7,070,398 | B2 | 7/2006 | Olsen et al. |
| 7,578,661 | B2 | 8/2009 | Koeneman |
| 7,638,915 | B2 | 12/2009 | Sentmanat |
| 7,981,696 | B2 | 7/2011 | Moreland et al. |
| 8,007,254 | B2 | 8/2011 | LaRose et al. |
| 8,366,411 | B2 | 2/2013 | Baykut et al. |
| 2004/0241019 | A1 | 12/2004 | Goldowsky |
| 2008/0085219 | A1 | 4/2008 | Beebe et al. |
| 2013/0318962 | A1 | 12/2013 | Joshi et al. |

OTHER PUBLICATIONS

Schonke et al.,"Infinite geometric frustration in a cubic dipole cluster", Physical Review B, 91, 020410(R) (2015).
Diller et al., "Remotely addressable magnetic composite micropumps", RSC Advances, Feb. 15, 2012, 2, 3850-3856.
Henighan et al., "Patterned magnetic traps for magnetophoretic assembly and actuation of microrotor pumps", Applied Physics Letters, 98, 103505 (2011).
Liu et al., "Modeling and optimization of colloidal micro-pumps", Journal of Micromechanics and Microengineering, Institute of Physics Publishing, J. Micromech. Microeng. 14 (2004) 567-575.
Kavi et al., "Magnetically actuated microrotors with individual pumping speed and direction control", Applied Physics Letters, 95, 023504 (2009).

Relevant Equations in Article 1

$$E_N = \sum_{i<j}^{N} \frac{\mathbf{m}_i \cdot \mathbf{m}_j |\mathbf{r}_{ij}|^2 - 3(\mathbf{m}_i \cdot \mathbf{r}_{ij})(\mathbf{m}_j \cdot \mathbf{r}_{ij})}{|\mathbf{r}_{ij}|^5}, \quad (1)$$

$$\cos\theta \cos\varphi - 2\sin\theta \sin\varphi = 1. \quad (2)$$

$$E_2 = \frac{m_1 m_2}{d^3} \cos(\alpha - \beta), \quad (3)$$

$$\mu_c = \frac{3\sqrt{3}}{4} \approx 1.299 \quad (4)$$

FIG. 6

CONTACTLESS MAGNETIC COUPLINGS FOR MICROFLUIDIC DEVICES AND NAUTICAL PROPULSION

BACKGROUND OF THE INVENTION

Field of the Invention

This invention relates to contactless magnetic couplings for microfluidic devices and nautical propulsion.

Description of Related Art

Magnetic gears have many advantages over mechanical gears. They are contactless and therefore not subject to mechanical wear. They need no lubrication and less maintenance than ordinary gears. They also exhibit inherent overload protection, are noiseless and highly reliable, and allow for the physical isolation of input and output. Various types of magnetic gears have been proposed and in some cases in use for various applications, such as for magnetic stirrer in a chemical lab, micro pumps, blood pumps, etc. However, a very efficient and smooth magnetic gears that can transmit driving force effectively and reliably have not realized in many applications. Also, in the case of application to fluid pumps, the existing designs require a large space, need to surround the fluid channel, produces undesirable cogging torques, and are inappropriate, in the case of application to microfluidic devices, for the "lab-on-a chip" type integrated design.

SUMMARY OF THE INVENTION

Accordingly, the present invention is directed to contactless magnetic couplings for microfluidic devices and nautical propulsion.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a device for moving a fluid with magnetic gear, comprising: a first shaft that is configured to be rotatable; two first balls each having a shape of sphere, respectively fixed to the first shaft through respective centers of the sphere, each of the first balls having a first magnetic dipole in a direction orthogonal to the first shaft with a center of the first magnetic dipole coinciding with the center of the sphere through which the first shaft penetrates; a second shaft that is freely rotatable and that is disposed in parallel with the first shaft; and a second ball having a shape of sphere, fixed to the second shaft through a center of the sphere of the second ball, the second ball having a second magnetic dipole in a direction orthogonal to the second shaft with a center of the magnetic dipole coinciding with the center of the sphere through which the second shaft penetrates, wherein the respective centers of the first balls and the center of the second ball are arranged so as to form an isosceles triangle with a vertex angle being defined about the center of the second ball and satisfying $$\psi = 2\arcsin\left(\frac{1}{\sqrt{3}}\right) \approx 70.53°$$

and so that the first balls and the second ball form a contactless magnetic gear, transmitting a rotational force of the first shaft to the second shaft, and wherein at least one of the second shaft and the second ball is physically connected to a blade structure that is placed in a passage of the fluid so that when the first shaft is rotated by an external driving force, the resulting rotation of the second shaft moves the fluid by said blade structure.

In the device described above, a magnitude $m_1$ of a dipole moment of each of the first magnetic dipoles of the first balls and a magnitude $m_2$ of a dipole moment of the second magnetic dipole of the second ball may satisfy $$\mu < \mu_c = \frac{3\sqrt{3}}{4} \approx 1.299,$$

where $\mu = m_2/m_1$, and the first balls may be fixed to the first shaft such that an inclination angle $\delta$ of a direction of the first magnetic dipole of one of the first balls relative to a direction of the first magnetic dipole of another of the first balls, as seen in a direction of the first shaft, satisfies:

$$\delta = \pm 2\arccos\frac{\mu}{\mu_c}.$$

Alternatively, in the device described above, a magnitude $m_1$ of a dipole moment of each of the first magnetic dipoles of the first balls and a magnitude $m_2$ of a dipole moment of the second magnetic dipole of the second ball may satisfy:

$$\mu \geq \mu_c = \frac{3\sqrt{3}}{4} \approx 1.299,$$

where $\mu = m_2/m_1$, and the first balls may be fixed to the first shaft such that the first magnetic dipoles of the first balls are in parallel with each other, thereby making an inclination angle $\delta$ of a direction of the first magnetic dipole of one of the first balls relative to a direction of the first magnetic dipole of another of the first balls, as seen in a direction of the first shaft, zero.

In another aspect, the present invention provides a microfluidic device, comprising: a microfluidic device body having a fluid channel for a fluid to pass through; and the device as set forth above, wherein at least the second shaft and the second ball are installed within the microfluidic device body, and wherein a plurality of micro-blades is attached to the second ball, and the second shaft and the second ball with the plurality of micro-blades are disposed in the fluid channel so as to act as a micro-pump for pumping the fluid in the fluid channel.

In the microfluidic device described above, the first shaft and the first balls may be disposed external to the microfluidic device body.

In another aspect, the present invention provides a propulsion mechanism for a ship, comprising: the device as set forth above; and a driving device installed inside a hull of a ship for rotatably driving the first shaft of the device, wherein the first balls and the first shaft are disposed inside the hull of the ship, and wherein the second ball and the second shaft are disposed outside of the hull of the ship to make contact with water outside of the ship, and a propeller in contact with the water is attached to the second ball or the second shaft so that the propeller rotates in response to the rotation of the first shaft and causes the ship to move.

In another aspect, the present invention provides a device for moving a fluid with magnetic gear, comprising: a first shaft that is configured to be rotatable; two first magnetic dipoles respectively orthogonally fixed to the first shaft through respective centers of the first magnetic dipoles; a second shaft that is freely rotatable and that is disposed in parallel with the first shaft; and a second magnetic dipole orthogonally fixed to the second shaft through a center of the second magnetic dipole, wherein the respective centers of the first magnetic dipoles and the center of the second dipoles are arranged so as to form an isosceles triangle with a vertex angle ψ being defined about the center of the second magnetic dipole and satisfying $$\psi = 2\arcsin\left(\frac{1}{\sqrt{3}}\right) \approx 70.53°$$

and so that the first dipoles and the second dipole form a contactless magnetic gear, transmitting a rotational force of the first shaft to the second shaft, and wherein at least one of the second shaft and the second magnetic dipole is physically connected to a blade structure that is placed in a passage of the fluid so that when the first shaft is rotated by an external driving force, the resulting rotation of the second shaft moves the fluid by said blade structure.

It is to be understood that both the foregoing general description and the following detailed description are exemplary and explanatory, and are intended to provide further explanation of the invention as claimed.

BRIEF DESCRIPTION OF THE DRAWINGS

FIG. 1 shows the construction of a system with three interacting dipoles which form a continuous state. This construction begins with the configuration shown in FIG. 8D below, and then the dipole D3 is added. The dipole pair D2D3 interacts in the same way as D1D2, while D1D3 forms the trivial continuum with aligned axes. The angle satisfying $$\psi = 2\arcsin\left(\frac{1}{\sqrt{3}}\right) \approx 70.53°$$

and the distances $\overline{D_1D_2}$ and $\overline{D_2D_3}$ are equal. FIG. 1 also corresponds to FIG. 5 in "Smooth Teeth: Why Multipoles Are Perfect Gears," Phys. Rev. Applied 4, 064007—Published 22 Dec. 2015 ("Article 1"), which is incorporated by reference in its entirety in the present disclosure.

FIG. 6 shows Equation (1) for calculating interaction energy ($E_N$), Equation (2) expressing the nonlinear relationship between angles φ and θ for creating a continuous ground state, Equation (3) for calculating the energy landscape $E_2$, and Equation (4) expressing the condition for establishing stable ground state. Equations (1) to (4) are as disclosed in Article 1.

FIGS. 8A and 8B illustrate the configurations of the continuous ground states created by the embodiments illustrated in FIGS. 7B and 7C, respectively.

FIG. 8C illustrates the configuration of a continuous ground state created by two dipoles, one of which is allowed to rotate about an orthogonal axis (dipole on the left left) and the other of which is allowed to rotate at an angle of 30° to the connecting line (dipole on the right).

FIG. 8D illustrates the configuration of a continuous ground state created by two dipoles which are allowed to rotate about axes that are parallel and at an angle of approximately 54.74° to the connecting line. FIG. 8E illustrates the configuration of a continuous ground state created by the embodiment illustrated in FIG. 7B, except that the rotation axis is rotated by 180°.

FIG. 8F illustrates a graph of one branch of Equation (2), as shown in FIG. 6, between the angles θ and φ, which are marked in FIGS. 8A to 8E and which set the rotation axes. The positions of the different configurations are marked on the graph, with A-E representing the configuration illustrated in FIGS. 8A to 8E, respectively.

DETAILED DESCRIPTION OF THE PREFERRED EMBODIMENTS

The invention is a fundamentally new design of a microfluidic pump, based on the present inventor's recent discovery of a new magnetic coupling principle between homogeneously magnetized balls. See, "Smooth Teeth: Why Multipoles Are Perfect Gears," Phys. Rev. Applied 4, 064007—Published 22 Dec. 2015 (referred to in this disclosure as "Article 1"), for example, abstract on page 064007-1 of Article 1, "Introduction" on pages 064007-1 to 064007-2 of Article 1, "Two Interacting Dipoles" on pages 064007-2 to 064007-4 of Article 1, "Three Interacting Dipoles" on pages 064007-4 to 064007-5 of Article 1, "The Quadrupole-Dipole System" on pages 064007-5 to 064007-6 of Article. Article 1 is hereby incorporated by reference in its entirety. Article 1 discloses a type of gear that operates based on the interaction of individual multiples. The underlying principle relies on novel continuous degenerate ground states for pairs of interacting multipoles which are free to rotate around specific axes. These special rotation axes, in turn, form a one-parameter family of possible configurations. This allows for the construction of magnetic bevel gears with any desired inclination angle between the in- and output axes. Further, the design of gear systems with more than two multipoles is possible and facilitates tailored applications. The simple construction needs minimal space and is well suited for modem lab-on-a-chip designs for microfluidic devices in the healthcare industry, which is a major advantage over currently available micro pump designs. The principle is also readily applicable to propulsion mechanisms for ships.

As detailed in Article 1, which is published within one year before the filing date, Dec. 19, 2016, of U.S. Provisional Application No. 62/436,392, to which the instant application claims the benefit, the present inventor has discovered a non-trivial, quite unexpectedly efficient and effective magnetic coupling between three interacting diploes, which form a continuous state. The basic arrangement of the magnetic diploes is depicted in FIG. 1.

Figure 1:
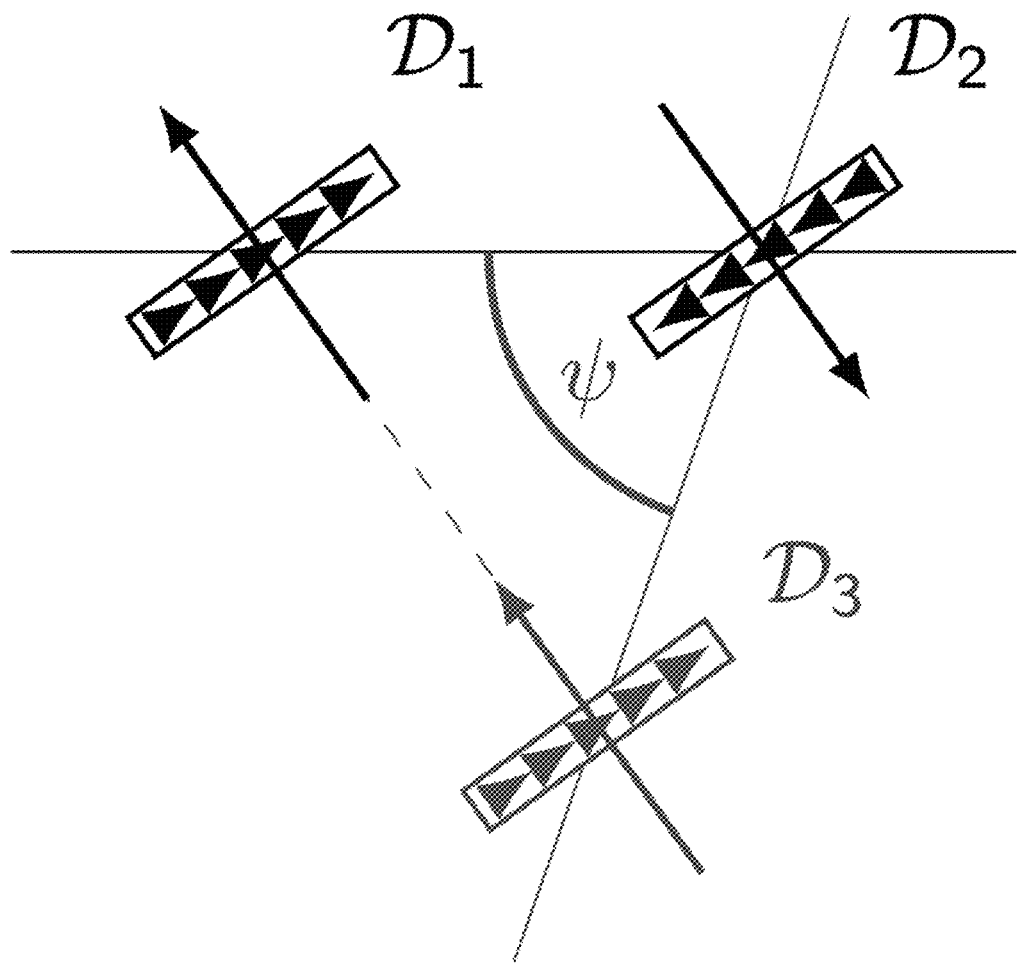
FIG. 1 schematically illustrates a newly discovered system of a very efficient and effective coupling of three interacting dipoles according to an embodiment of the present invention.

As shown in FIG. 1, three dipoles D1 through D3 are arranged to form an isosceles triangle with a vertex angle $\psi$ being defined as shown in the figure. It was discovered that at $$\psi = 2\arcsin\left(\frac{1}{\sqrt{3}}\right) \approx 70.53°,$$

the coupling is efficient and continuous. As detailed in Article 1, this finding is unexpected and non-trivial. With this coupling, for example, if the dipoles $D_1$ and $D_3$ are rotated together with a single rotation shaft driven by a motor, the dipole $D_2$ is caused to rotate efficiently in a continuous manner, which was not achieved easily with this type of one-side arrangement before. Prior structures for contactless couplings are generally coaxial and often must surround the freely rotating shaft. Here, the driving shaft connected to the dipoles $D_1$ and $D_3$ are placed side-by-side with the freely rotating shaft connected to the dipole $D_2$. This simple configuration has various advantages, such as applicability to minute structures desired for microfluidic system designs, such as microfluidic cuvettes, and to propulsion mechanisms for a ship, as will be described in detail below.

It is also found that it is preferable to satisfy the following conditions for magnitudes of the dipole moments for these dipoles. The magnitude $m_1$ of the dipole moment of each of dipoles $D_1$ and $D_3$ and the magnitude $m_2$ of the dipole moment of dipole $D_2$ satisfy:

$$\mu < \mu_c = \frac{3\sqrt{3}}{4} \approx 1.299,$$

where $\mu=m_2/m_1$, and an inclination angle $\delta$ between $D_1$ and $D_3$ satisfies:

$$\delta = \pm 2\arccos\frac{\mu}{\mu_c}.$$

Also, it is found that it is preferable to satisfy the following conditions for magnitudes of the dipole moments for these dipoles. The magnitude $m_1$ of the dipole moment of each of dipoles $D_1$ and $D_3$ and the magnitude $m_2$ of the dipole moment of dipole D2 satisfy:

$$\mu \geq \mu_c = \frac{3\sqrt{3}}{4} \approx 1.299,$$

where $\mu=m_2/m_1$, and an inclination angle $\delta$ between $D_1$ and $D_3$ satisfies:

$\delta=0$.

That is, $D_1$ and $D_3$ are parallel in this case.

An exemplary realization of this basic structure may be attained by using uniformly magnetized spherical balls for these magnetic dipoles.

Figure 2:
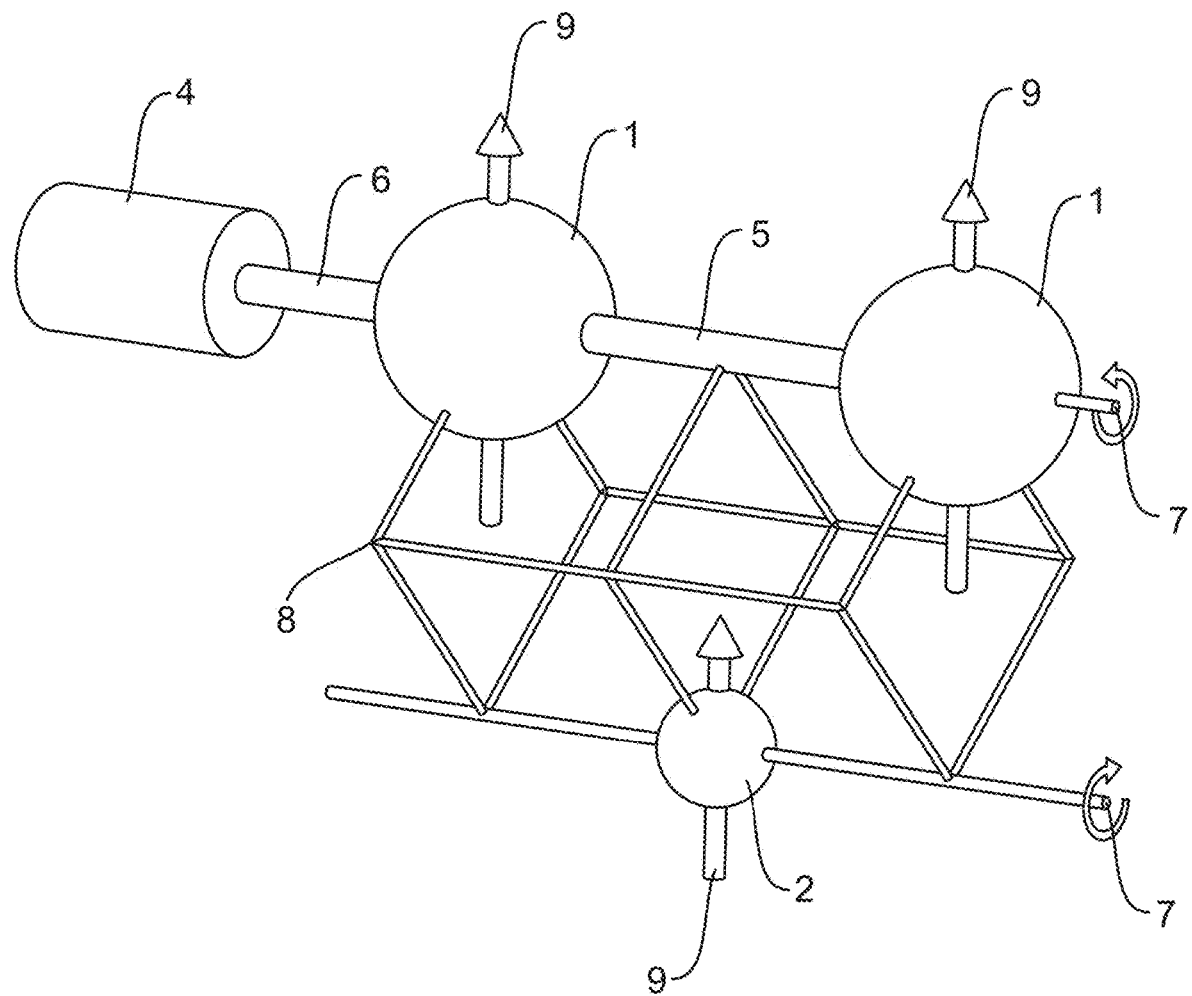
FIG. 2 schematically illustrates an exemplary configuration of the coupling illustrated in FIG. 1 using three magnetized balls.

FIG. 2 schematically illustrates an exemplary configuration of the coupling illustrated in FIG. 1 using three magnetized balls. FIG. 2 shows a case of magnetic coupling, rather than electric coupling. The driving magnetic ball, 1 are connected by the shaft 5 and are rotated via the driving shaft 6 connected to the motor 4. The magnetic ball 2 is driven through the magnetic interaction with the balls 1. The balls 1 and 2 rotate around two parallel axes 7. The orientation of the magnetic dipole moments 9 of the balls, as shown in the figure by the arrows, is set to be always orthogonal to the rotation axes 7. The necessary positioning of the magnetic balls for a smooth transmission of rotary motion is visualized with the help of two wire cubes 8, which schematically visualize the contactless magnetic interaction between the pair of balls 1 and the ball 2.

Figure 3:
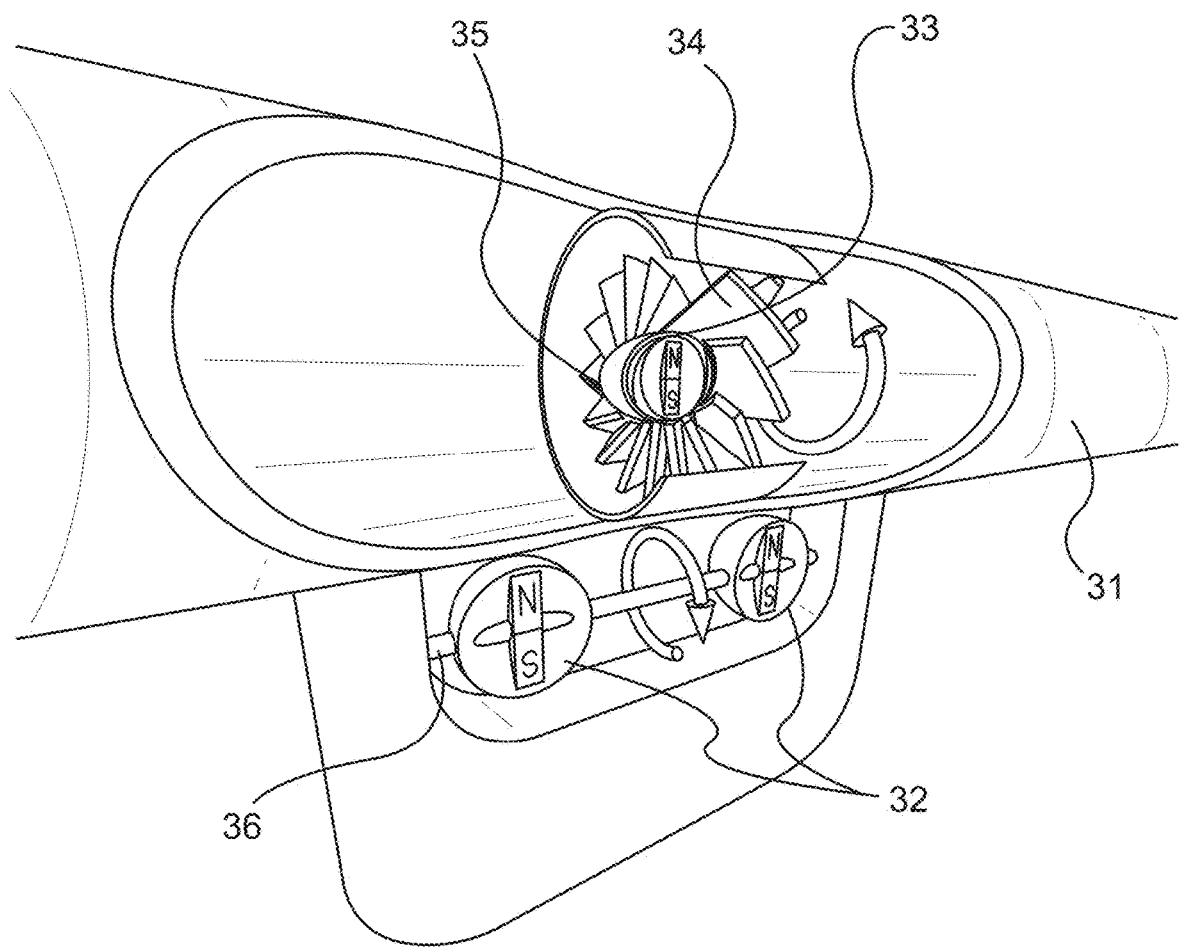
FIG. 3 schematically illustrates a microfluidic pump according to an embodiment of the present invention.

FIG. 3 schematically illustrates a microfluidic pump according to an embodiment of the present invention. The figure shows the first design of the microfluidic pump. A turbine 34 is placed within the fluid channel 31. A homogeneously magnetized ball 33 is embedded at the center of the turbine 34. To drive the turbine 34, two larger homogeneously magnetized balls 32 connected to each other and to a power source (not shown) via a shaft 36 are positioned outside of the channel such that the three balls 32, 33 together form a very specific isosceles triangle geometry, as described above with reference to FIG. 1. In this special configuration, a smooth torque transmission between the two driver balls 32 and the ball 33 attaching the turbine 34 is facilitated. If the two driver magnets 32 below the channel are rotated through some power source as indicated by the arrow, the third magnet 33 inside the channel will make the turbine 34 rotate about the rotating shaft 35, pumping the liquid in the fluid channel 31 forward. The principle is perfectly suited for the so-called "lab-on-a-chip" designs. The driver unit is simply placed on the chip.

Figure 4:
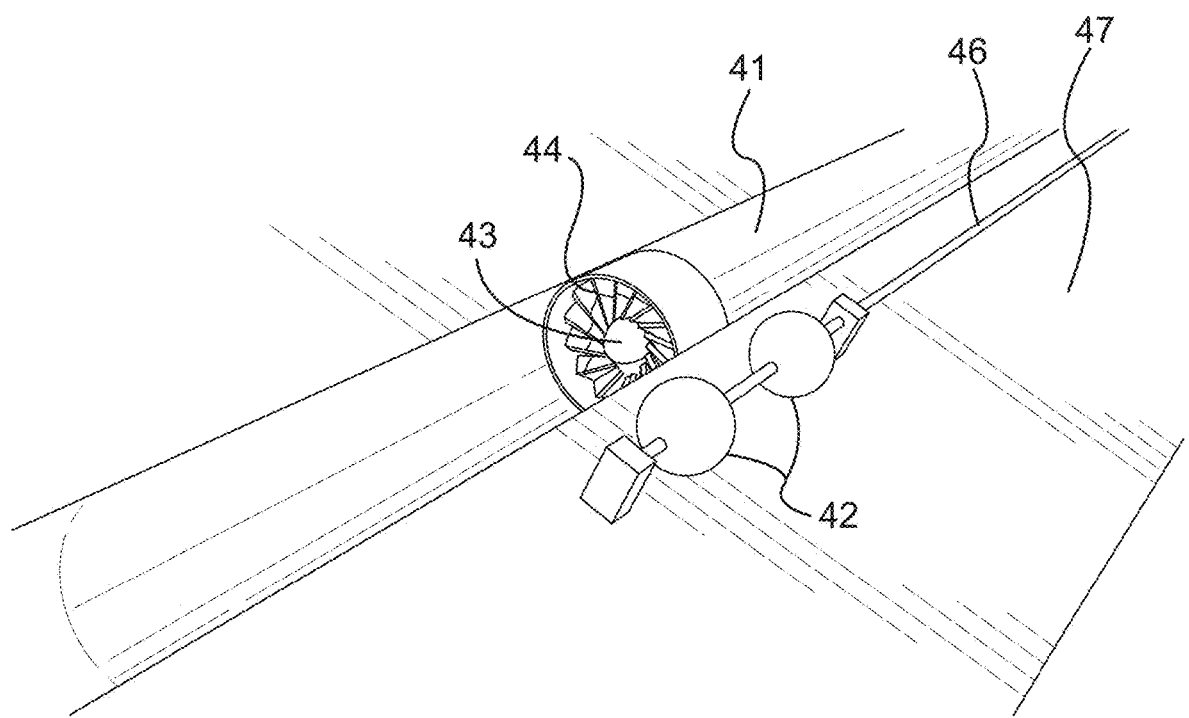
FIG. 4 schematically illustrates a microfluidic pump installed for a microfluidic device according to an embodiment of the present invention.

FIG. 4 schematically illustrates a microfluidic pump installed for a microfluidic device according to an embodiment of the present invention. Similar to the structure of the ball 33 and turbine 34 shown in FIG. 3, this microfluidic device has the turbine 44 attached to a magnetized ball 43 installed in the fluid channel 41. The driving magnetized balls 42 are disposed on the surface of the microfluidic device 47 and are connected to the rotating shaft 46 driven by some external means, such as a motor. The balls 42 and the ball 43 and their respective magnetic dipoles form a configuration depicted in FIG. 1 above. By rotating the shaft 46 and balls 42, the turbine 44 is driven to pump the fluid in the fluid channel 41. The driving balls 42 and the shaft 46 may be part of the device 47, or alternatively, may be detachably provided as an external mechanism to drive the turbine 44. The microfluidic device to which the microfluidic pump of the present embodiment is applied may be a microfluidic cuvette, for example.

Any known magnetic materials, preferably strong permanent magnetic materials, may be used for the material for the magnetic balls 32, 33, 42, and 43. Moreover, any known materials for constructing microfluidic devices may be used as long as the material does not interfere with the magnetic fields generated by these balls. To create the device and similar chips, selective laser-induced etching techniques and 3D laser lithography system may be employed.

As noted above, the existing magnetic gear designs are mostly based on geometries with two coaxial cylinders, a concept which would make the application impractical for a pump shown in FIG. 4 because the outer (driving) cylinder would have to rotate around the whole channel.

Beyond microfluidics, the above-described configuration is applicable in all areas where the input and output have to be physically isolated, and high reliability is crucial. This especially targets systems which operate underwater or generally in "rough" weather, for which maintenance is complicated and expensive. This includes in general all kinds of nautical propulsion, but in particular small autonomous underwater vehicles (drones). The same goes for small aircraft. Further, the area of renewable energies is of interest, with applications in wind turbines and tidal power plants.

Figure 5:
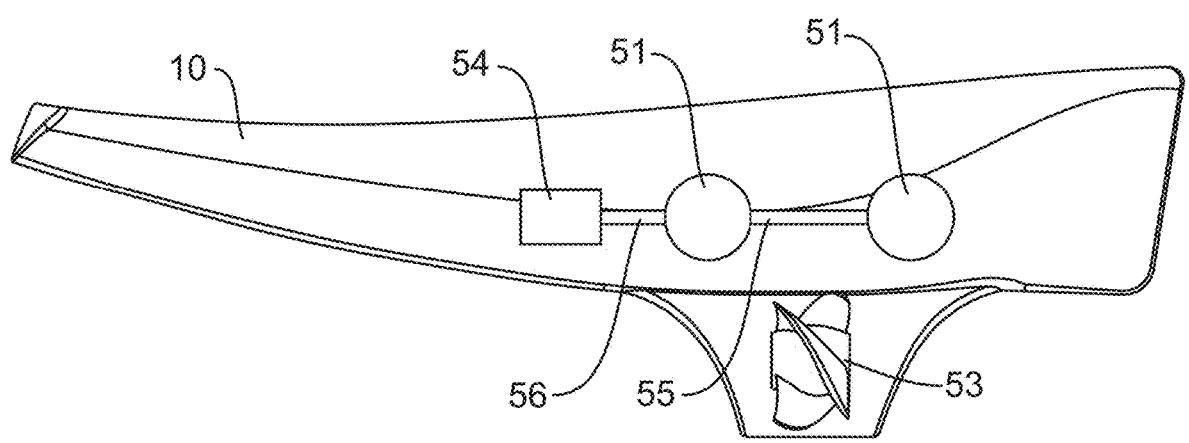
FIG. 5 schematically illustrates a propulsion mechanism for a ship according to an embodiment of the present invention.

FIG. 5 schematically illustrates a propulsion mechanism for a ship according to an embodiment of the present invention. The driven magnetic ball is positioned in the center of the ship's propeller 53. The driving magnetic balls 51 are connected to each other by the first shaft 55, and are rotated by the motor 54 that drives the second shaft 56 connecting the motor 54 to the driving magnetic balls 51, and these components are installed inside the hull 10 of the ship. Outside the hull 10, the propeller 53 is rotatably mounted on the bottom of the ship in contact with water. One advantage of this design is that the ship's propeller 53 has no physical contact to the other machine parts inside the ship's hull 10. This biaxial design with the lateral positioning of the ship's propeller further improves the efficiency of the propulsion.

As described above, the present invention is applicable to many driving mechanisms and has advantages of one or more of the followings: a simple principle that needs minimal space; production is inexpensive, and flexible geometries are possible; in the case of application to microfluidic pump, it is particularly suited for "lab-on-a-chip" designs.

<Excerpts from Article 1, "Smooth Teeth: Why Multipoles Are Perfect Gears," Phys. Rev. Applied 4, 064007—Dec. 22, 2015 ("Article 1")>

As described above, the dipole configurations described above with reference to FIG. 1 is non-trivial and surprising. The theoretical aspects of the configuration and the unexpected nature of this discovery are described in detail in Article 1, "Smooth Teeth: Why Multipoles Are Perfect Gears," Phys. Rev. Applied 4, 064007—Dec. 22, 2015 ("Article 1"), which is published within one year before the filing date, Dec. 19, 2016, of U.S. Provisional Application No. 62/436,392, to which the instant application claims the benefit. The full disclosure of Article 1 is hereby incorporated by reference. Below, some relevant excerpts from Article 1 are reproduced so as to explain the non-trivial and surprising nature of the configuration described above in more detail. Furthermore, the excerpts provided below also describe a newly discovered quadrupole-dipole interaction that may be also applicable to various mechanisms in a manner similar to those described above.

Below, the texts are reproduced from Article 1, but where applicable, references to equations and figures are modified to refer to the equations described in this disclosure and the figures accompanying this disclosure.

<Abstract>

A new type of gear is proposed based on the interaction of individual multipoles. The underlying principle relies on previously unknown continuous degenerate ground states for pairs of interacting multipoles which are free to rotate around specific axes. These special rotation axes in turn form a one-parameter family of possible configurations. This allows for the construction of magnetic bevel gears with any desired inclination angle between the in- and output axes. Further, the design of gear systems with more than two multipoles is possible and facilitates tailored applications. Ultimately, an analogy between multipoles and mechanical gears is revealed. In contrast to the mechanical case, the multipole "teeth" mesh smoothly. As an illustrative application, the example of a quadrupole-dipole interaction is then used to construct a 1:2 gear ratio.

<I. Introduction>

A very useful device in a chemistry lab is the magnetic stirrer, but magnetic couplings like this one are not only found in scientific equipment—even the newest milk frothers use them to create the perfect topping for your coffee. On a smaller scale, magnetic mechanisms and couplings are used in microfluidic systems to serve as pumps, valves, or mixers; and on the even smaller scales of the nano world, molecular machines are in fact restricted to electronic or magnetic interactions. What if we could use such elementary structures like dipoles or quadrupoles individually to transmit rotary motion in a very flexible way? Today's industrial magnetic gear designs are based on arrays of many permanent magnets which mimic the teeth of classical mechanical gears. Here we propose gears fundamentally different from these designs, based on the interaction of individually rotating multipoles. This approach allows us to construct gears with inclined axes and leads further to configurations, which consists of three dipoles that form a smooth coupling. Finally, we uncover an analogy between multipoles and mechanical gears and demonstrate that a quadrupole and a dipole can be used to construct a gear ratio of 1:2. The findings in this paper initiate completely new questions for theoretical physics about the necessary conditions for which smooth couplings between multipoles are possible. At the same time, the first constructions reported here can already be used in many different applications, a few of them we mentioned above.

Although the mechanical gear was invented in antiquity, the idea of a magnetic gear is only a hundred years old. Magnetic gears have many advantages: Being free of contact, they are not subject to mechanical wear, need no lubrication, possess inherent overload protection, are noiseless, are highly reliable, and operate with reduced maintenance. Moreover, the input and output can be physically isolated. With the appearance of strong magnets based on alloys of rare earth elements, the interest in magnetic gears grew because of increased torque transmission capabilities. In the last decade, innovative designs for the magnetic gear topology further increased the possible torque densities. Today magnetic gears can compete with mechanical realizations in industrially relevant applications. Most of the designs are coaxial and include intricate constructions like planetary and cycloid gears. Biaxial systems can also be found. Specifically related to the current work is the discussion of the undesirable cogging torque, namely periodic variation of the transmitted torque during revolution induced by the geometry and magnetization pattern of the gear. So far, the only realization capable of avoiding cogging torque is the coaxial gear with a 1:1 ratio, generally referred to as the "synchronous axial coupling."

<II. Two Interacting Dipoles>

We begin with the following problem statement: Place a set of multipoles in space and allow them to rotate around predefined axes. Under which conditions (regarding positioning and orientation of the axes) do these multipoles possess a continuous ground state (CGS) in the sense that the lowest possible energy configuration is degenerate? Once such a state is found, we can rotate one of the multipoles and the others will follow without any counterforce; a smooth coupling is created without any cogging torque.

If the system consists of dipoles only, the interaction energy ($E_N$) reads for a total number of N dipoles, as shown in Equation (1)

$$\left(\text{i.e., } E_N = \sum_{i<j}^{N} \frac{m_i \cdot m_j |r_{ij}|^2 - 3(m_i \cdot r_{ij})(m_j \cdot r_{ij})}{|r_{ij}|^5}\right),$$

where $m_1 \ldots m_n$ are the variable dipole moments and $r_{i,j}$ denotes the fixed relative position vector between dipoles i and j.

Figure 7A:
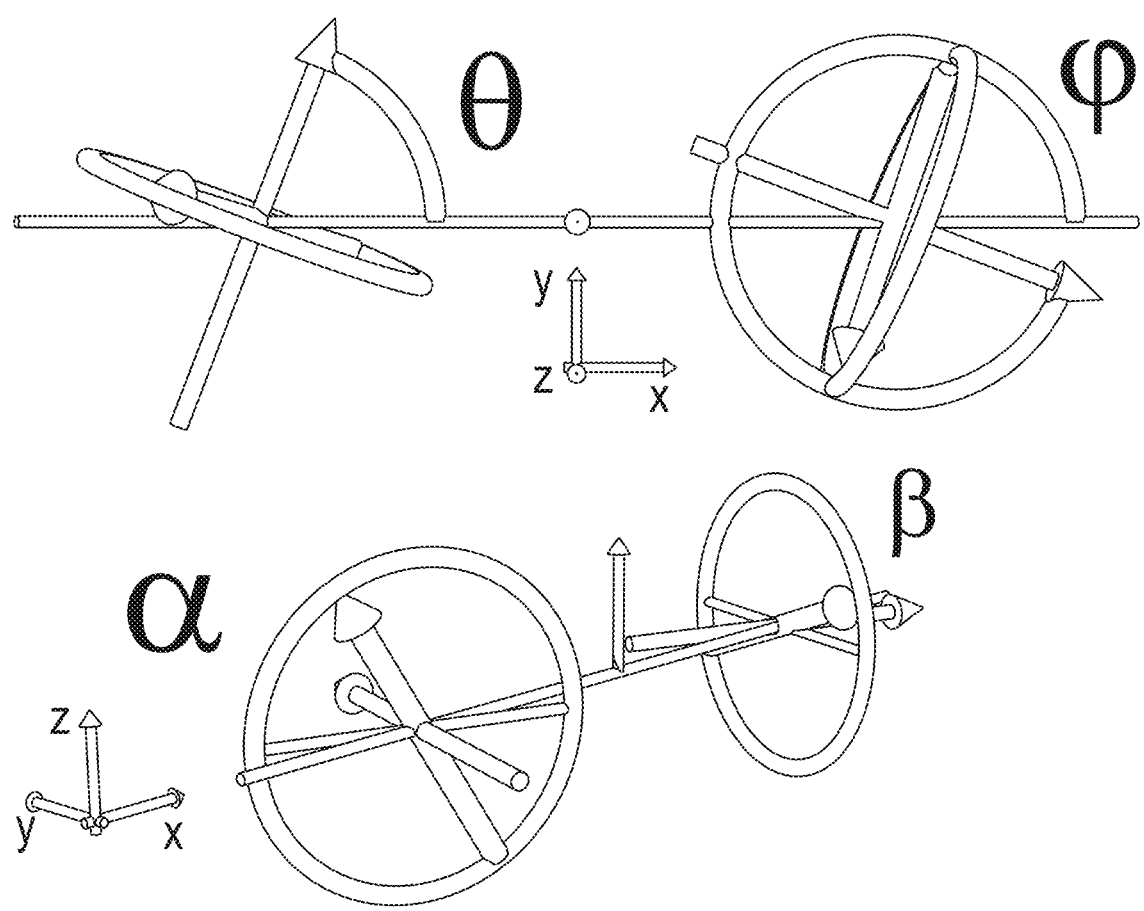
FIG. 7A corresponds to FIG. 1 in Article 1, and illustrates schematically the angles which describe the rotation of the dipoles. The upper panel introduces the two angles θ and φ which set the positions of the rotation axes. The rotation axes are restricted to lie in the x-y plane. The angles θ and φ (and therefore, the rotation axes) are fixed for a given configuration. The lower panel introduces the angles α and β which correspond to the 2 degrees of freedom the system possesses. α and β describe the actual orientation of the two dipoles during rotation.

First, we consider the case of two dipoles separated by a fixed distance d that are allowed to rotate only around fixed axes orthogonal to their dipole moment, see FIG. 7A (corresponding to FIG. 1 in Article 1).

FIG. 7A (corresponding to FIG. 1 in Article 1) shows the definition of the angles which describe the rotation of the dipoles. The upper panel introduces the two angles θ and q, which set the positions of the rotation axes. The rotation axes are restricted to lie in the x-y plane. The angles θ and φ (and therefore the rotations axes) are fixed for a given configuration. The lower panel introduces the angles α and β which correspond to the two degrees of freedom the system possesses. α and β describe the actual orientation of the two dipoles during rotation.

In this case, there is an obvious trivial solution to the posed problem: The two rotation axes are aligned and the two dipoles are antiparallel (FIG. 7B (corresponding to FIG. 2(a) in Article 1)).

Figure 7B:
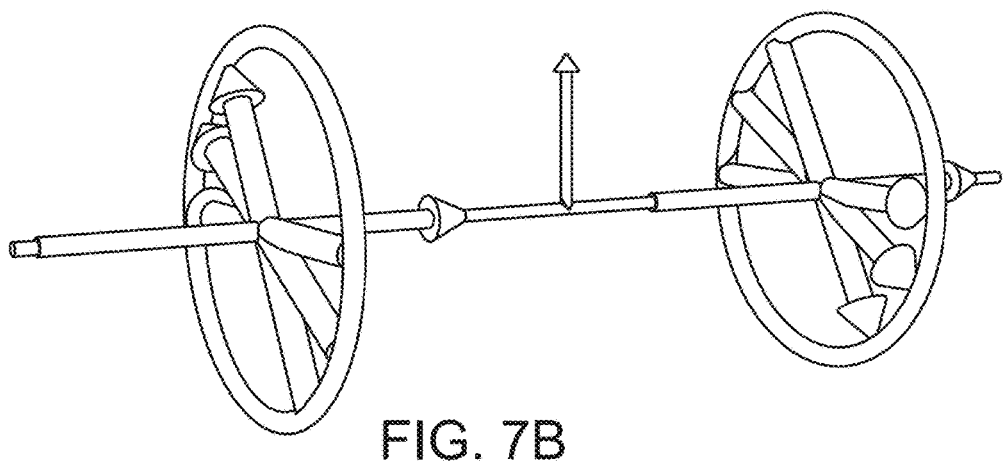
FIG. 7B corresponds to FIG. 2(a) in Article 1, and illustrates a trivial example for a continuous ground state created by two dipoles which are allowed to rotate about a common axis. The arrows inside the rings illustrate the dipole motion in the ground state for three different times. The horizontal rings extending in the direction of the common axis define the prescribed rotation axes, and the rings guide the eye regarding the path the arrows inside the rings take while rotating. The small upward arrow in the middle is normal to the horizontal plane.
Figure 7C:
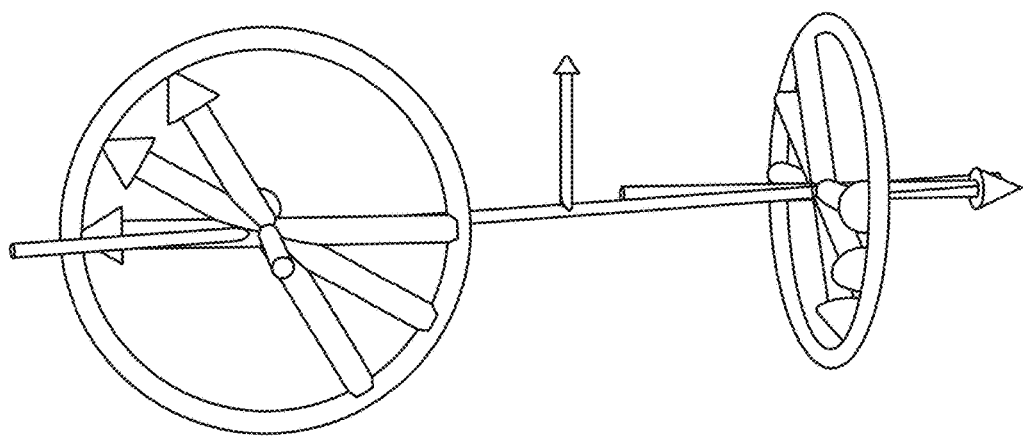
FIG. 7C corresponds to FIG. 2(b) in Article 1, and illustrates an example of a continuous ground state created by two dipoles which are allowed to rotate about two orthogonal axes. The arrows are as defined for FIG. 7B.
Figure 7D:
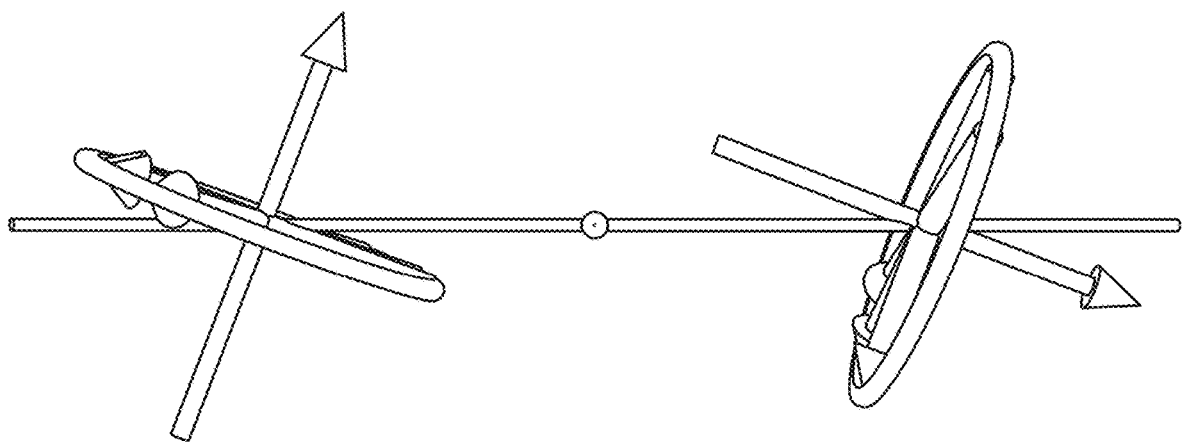
FIG. 7D corresponds to FIG. 2(c) in Article 1, and illustrates the same configuration as in FIG. 7C but viewed from the top along the normal vector of the horizontal plane in which the rotation axes are lying.
Figure 7E:
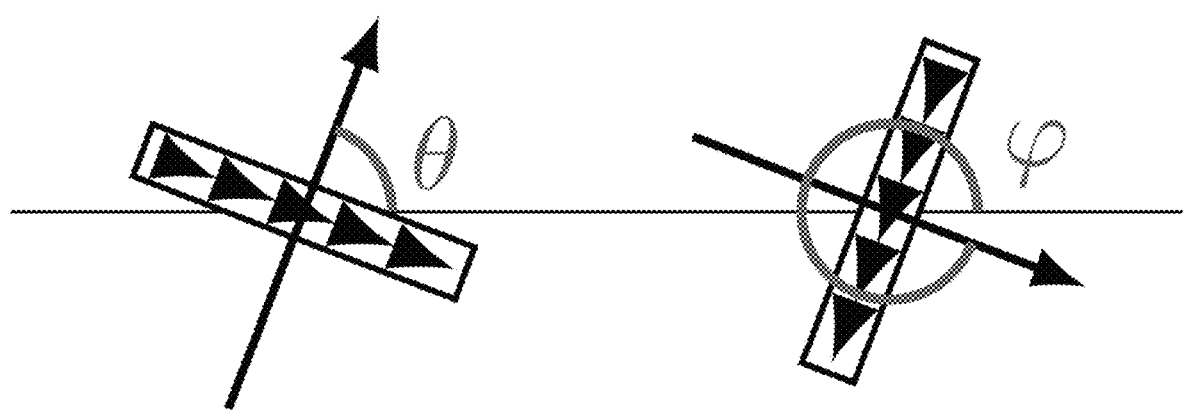
FIG. 7E corresponds to FIG. 2(d) in Article 1, and illustrates schematically the view from the top defining the positions of the rotation axes via the angles θ and φ.

FIG. 7B (corresponding to FIG. 2(a) in Article 1) shows the trivial example for a continuous ground state created by two dipoles which are allowed to rotate about a common axis. The arrows within the dipoles (represented by the rings) illustrate the dipole motion in the ground state for three different times. The arrows extending in the direction of the common axis define the prescribed rotation axes and the rings guide the eye regarding the path the colored arrows take while rotating. The small upward arrow in the middle is normal to the horizontal plane. FIG. 7C (corresponding to FIG. 2(b) in Article 1) shows an example for a continuous ground state created by two dipoles which are allowed to rotate about two orthogonal axes. FIG. 7D (corresponding to FIG. 2(c) in Article 1) is the same configuration as in FIG. 7C (corresponding to FIG. 2(b) in Article 1) but viewed from the top along the normal vector of the horizontal plane in which the rotation axes are lying. FIG. 7E (corresponding to FIG. 2(d) in Article 1) shows a schematic of the view from the top defining the positions of the rotation axes via the angles θ and φ.

This configuration is precisely the previously mentioned synchronous axial coupling, realized with two dipoles. The principle behind this solution is not related to the nontrivial findings described below because it does not rely on dipole interactions. This system describes a continuous state simply because it exhibits an obvious rotational symmetry about the one and only rotation axis.

It should be noted that all input and output axes of the gears mentioned in the Introduction are parallel, moreover, most of them are in fact coaxial. We now consider two dipoles and seek inclined rotation axes lying in a common plane with the objective of creating a CGS. For an example showing that such states exist see FIGS. 7C and 7E (corresponding to FIGS. 2(*b*) and 2(*d*) in Article 1, respectively). In this example, the rotation axes are orthogonal. The obvious question is: How many configurations exist for two dipoles so that they form a CGS? It turns out that there are infinitely many. Referring to the definition of the angles θ and φ which fix the rotation axes of the two dipoles (cf. FIGS. 7A and 7E (corresponding to FIGS. 1 and 2(d) in Article 1, respectively)), for every choice of θ, there exists a q, which creates a CGS. The condition can be expressed as the nonlinear relation expressed in Eq. (2) (i.e., cos θ cos φ−2 sin θ sin φ=1).

Figure 8A:
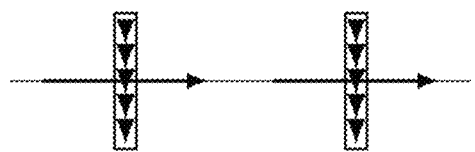
FIGS. 8A to 8F correspond collectively to FIG. 3 in Article 1, and illustrate configurations of continuous ground states created by two dipoles which are allowed to rotate about fixed axes in a common plane.
Figure 8B:
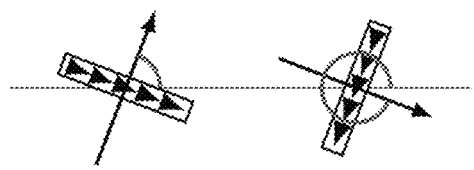
Figure 8C:
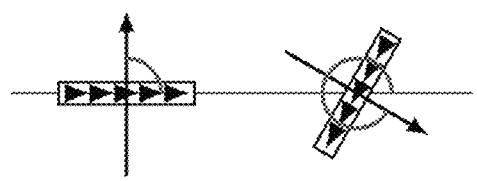
Figure 8D:
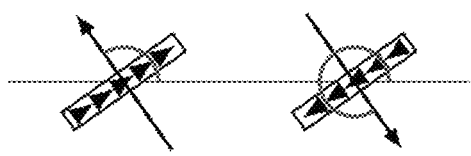
Figure 8E:
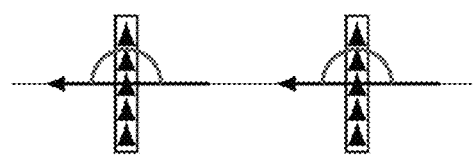
Figure 8F:
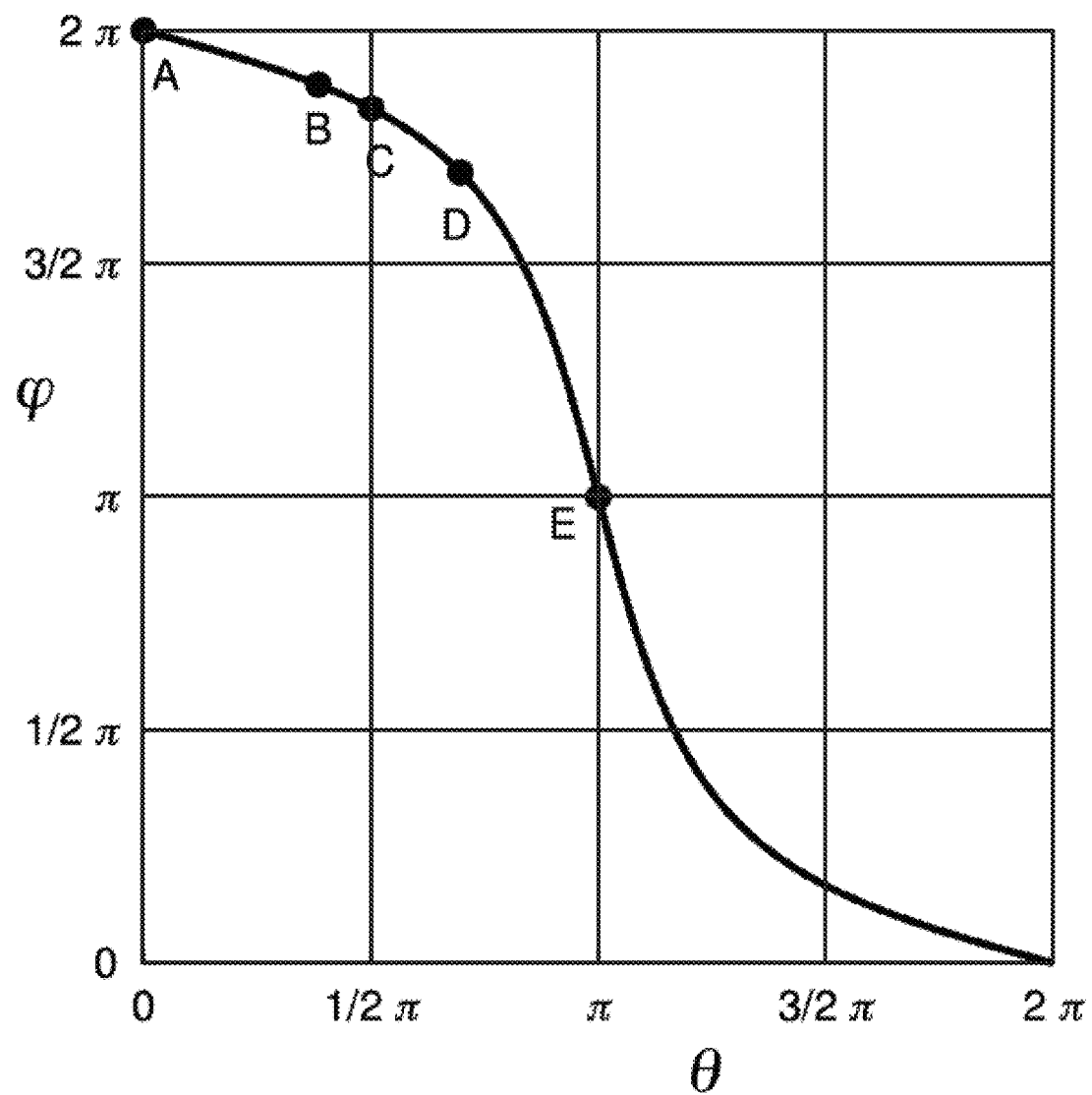

In view of Eq. (2), every angle between the two rotation axes can be realized. FIGS. 8A to 8F (collectively corresponding to FIG. 3 in Article 1) show configurations of continuous ground states created by two dipoles which are allowed to rotate about fixed axes in a common plane. The schematic view in panel A-E was introduced in FIG. 7E (corresponding to FIG. 2(d) in Article 1). FIG. 8A shows the trivial example from FIG. 7B (corresponding to FIG. 2(a) in Article 1). FIG. 8B shows the orthogonal axes example from FIG. 7C (corresponding to FIG. 2(b) in Article 1). In FIG. 8C, the left axis is orthogonal and the right axis is at an angle of 30 degrees to the connecting line. In FIG. 8D, both axes are parallel and at an angle of approximately 54.74 degrees to the connecting line. FIG. 8E is again the trivial example rotated by 180 degrees. In FIG. 8F, the graph of one branch of relation satisfying Eq. (2) between the angles θ and q', which set the rotation axes is shown (cf. FIG. 7E (corresponding to FIG. 2(d) in Article 1)). The positions of the different configurations are marked on the graph.

Figure 9:
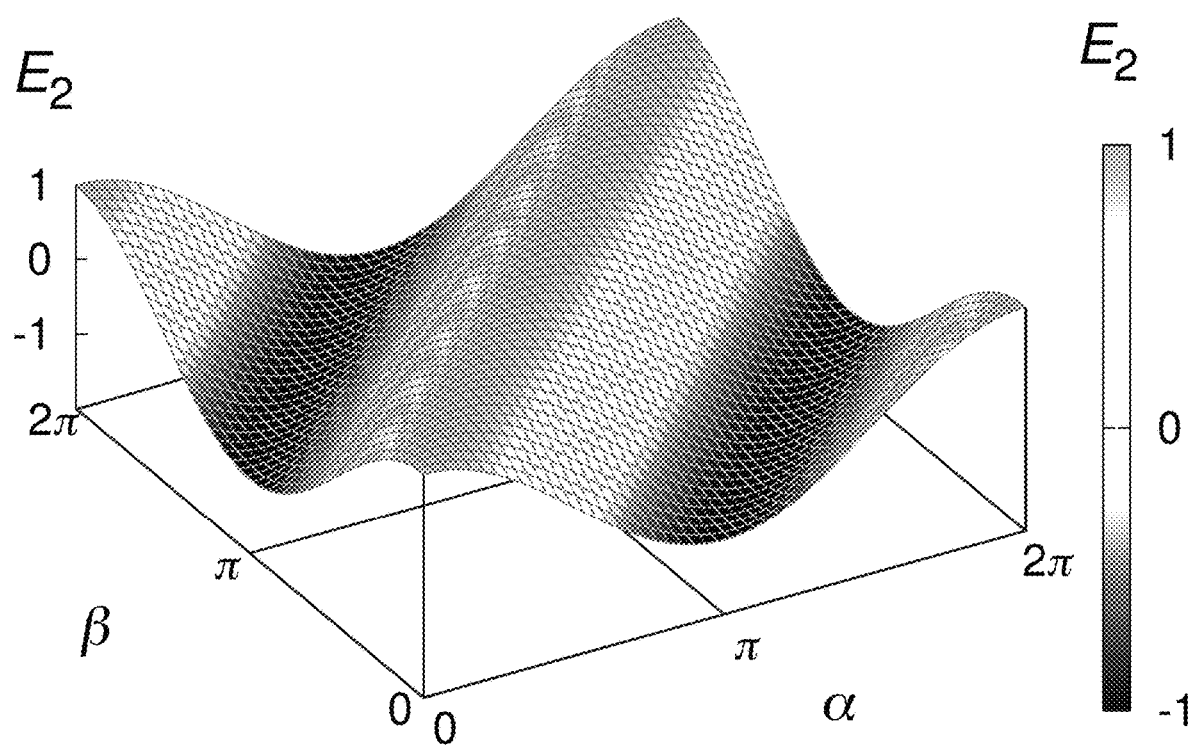
FIG. 9 corresponds to FIG. 4 in Article 1, and illustrates the degenerate energy landscape ($E_2$) for two interacting dipoles ($m_1=m_2=d=1$) obeying Equation (2), as shown in FIG. 6. The system is in its ground state if $\alpha-\beta=\pi$. Only in the trivial case of aligned rotation axes ($\theta=\varphi=0$) this means the two dipoles are antiparallel in the ground state.

In FIGS. 8A to 8F (collectively corresponding to FIG. 3 of Article 1), we show some notable configurations in the schematic view introduced in FIG. 7E (corresponding to FIG. 2(d) in Article 1) together with the graph of one branch of the relation between θ and φ implied by Eq. (2). The second branch (obtained by reflecting the depicted branch over the line θ=φ) does not contain new configurations up to symmetries. For the continuum of possible rotation axes described by Eq. (2), the energy ($E_2$) is independent of θ and φ and has the form expressed by Eq. (3)

$$\left(\text{i.e., } E_2 = \frac{m_1 m_2}{d^3}\cos(\alpha - \beta)\right)$$

where $E_2$ is energy, $m_1$ and $m_2$ are the magnitudes of the moments and d is the distance between the dipoles. Therefore, the dynamics of two rotating dipoles are identical for all configurations obeying Eq. (2), since the Hamiltonian has the same form. FIG. 9 (corresponding to FIG. 4 in Article 1) shows the energy landscape according to Eq. (3).

FIG. 9 (corresponding to FIG. 4 in Article 1) shows a degenerate energy landscape according to Eq. (3) for two interacting dipoles ($m_1=m_2=d=1$) obeying Eq. (2). The system is in its ground state if α−β=π. Only in the trivial case of aligned rotation axes (θ=φ=0) this means the two dipoles are antiparallel in the ground state.

Note that if the restriction to specific rotation axes is dropped and free orientations in 3D space are allowed, so far only one finite arrangement with a CGS was previously known; the case of eight dipoles at the corners of a cube. Indeed, the discovery of the dipole cube provided the initial motivation for seeking other CGS since it could be argued that this arrangement was a unique peculiarity. We stress that the restriction to specific rotation axes in the current paper constitutes a fundamentally different class of systems compared to the free orientations. The best example is the dipole-dipole case: Put two dipoles next to each other and let them orient freely in 3D space, they will align their moments coaxial head to tail—and form a discrete (non-continuous) ground state. For free orientations, not any one of the proposed mechanisms in this paper would work. For engineering applications, the restriction to rotation axes has an even greater practical significance because primary concern is with the transmission of torques from one axis to one or several other axes. But the dipole cube is also a solution for this class of problems if we choose the rotation axes as the respective volume diagonals of the cube: because even if the dipoles can be freely oriented in the cube they actually force each other into planes orthogonal to the respective volume diagonal.

<III. Three Interacting Dipoles>

We next use the results for two dipoles to construct a system of three interacting dipoles which form a CGS and therefore act as gears which transmit mechanical torques. For this to be a continuous state, every pair of dipoles needs to form such a state. For the configuration shown in FIG. 8D (corresponding to panel D in FIG. 3 in Article 1), it is possible to add another dipole at the position shown in FIG. 1 (corresponding to FIG. 5 in Article 1), while keeping the continuous state.

FIG. 1 (corresponding to FIG. 5 in Article 1) shows a construction of a system with three interacting dipoles which form a continuous state. This construction begins with the configuration shown in FIG. 8D (corresponding to panel D in FIG. 3 in Article 1), and then the dipole $D_3$ is added. The dipole pair $D_2D_3$ interacts in the same way as $D_1D_2$, while $D_1D_3$ forms the trivial continuum with aligned axes. The angle $$\psi = 2\arcsin\left(\frac{1}{\sqrt{3}}\right) \approx 70.53°,$$

and the distances $\overline{D_1D_2}$ and $\overline{D_2D_3}$ are equal.

Figure 10:
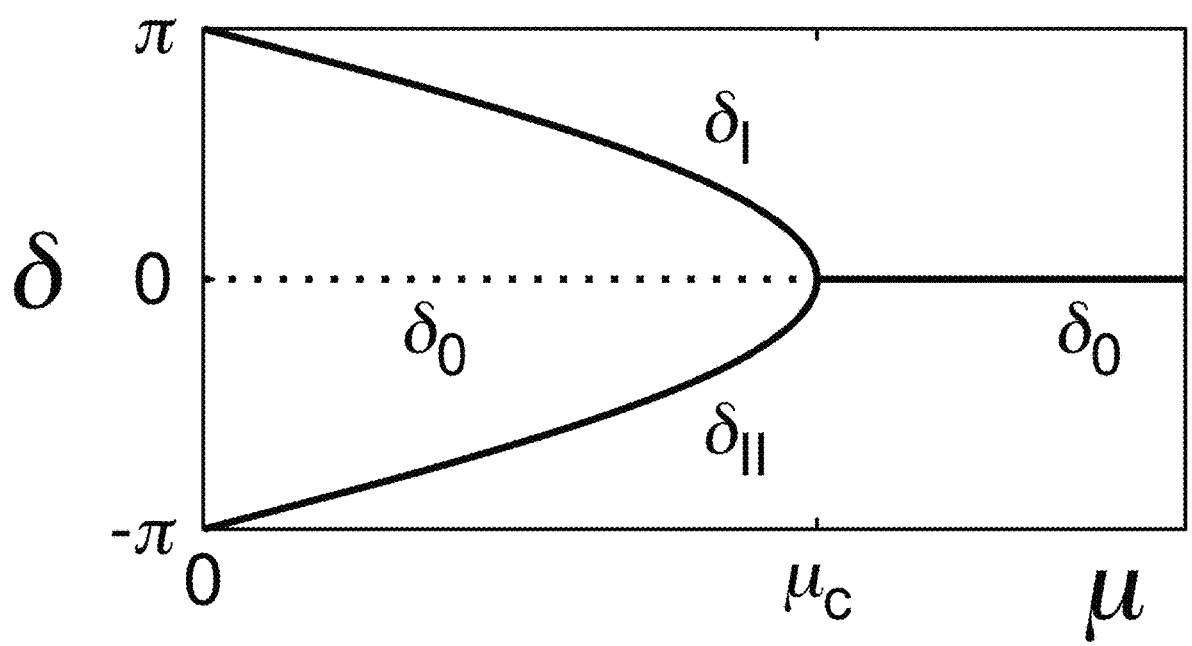
FIG. 10 corresponds to FIG. 6 in Article 1, and illustrates a bifurcation diagram for the system of three dipoles showing the stable (solid lines) and unstable (dotted line) inclination angles $\delta$ between dipole $D_1$ and $D_3$ as a function of the dipole moment ratio $\mu=m_2/m_1$. At $\mu_c$, a pitchfork bifurcation occurs.

The additional dipole $D_3$ interacts with $D_2$ exactly in the same way as the pair $D_1D_2$ does whereas the pair $D_1D_3$ forms the trivial continuum with aligned axes. From symmetry arguments, one might assume that for the system to work, the dipoles $D_1$ and $D_3$ need to be oriented parallel. This configuration corresponds to the maximum energy state for the pair $D_1D_3$, which is unstable. That raises the question how the overall system can be in its stable ground state? The idea is to increase $m_2$ to make this particular configuration stable (with $m_i$ we denote the magnitude of the dipole moment $m_i$ of $D_i$). For the stability analysis of the possible equilibria we assume $m_1=m_2$ and define the magnitude ratio $\mu:=m_2/m_1$. For a critical ratio expressed in Eq. (4)

$$\left(\text{i.e., } \mu_c = \frac{3\sqrt{3}}{4} \approx 1.299\right),$$

the system undergoes a pitchfork bifurcation. If $\mu \geq \mu_c$, the dipoles $D_1$ and $D_3$ are parallel. Interestingly enough, for $\mu < \mu_c$, the two stable states are both CGS (an "additional" twofold degeneracy). In these states, the dipoles $D_1$ and $D_3$ are inclined with respect to their common axis and maintain this inclination during the rotation in the continuous state analogous to a rigid body rotation. Denoting the inclination angle with δ, we can characterize the three states which are stable for at least some values of μ as:

$$\delta_0 = 0, \delta_{I,II} = \pm 2\arccos\frac{\mu}{\mu_c}, \quad (5)$$

and show the in FIG. 10 (corresponding to FIG. 6 in Article 1).

FIG. 10 (corresponding to FIG. 6 in Article 1) shows a bifurcation diagram for the system of three dipoles showing the stable (solid lines) and unstable (dotted line) inclination angles o between dipoles $D_1$ and $D_3$ as a function of the dipole moment ratio $\mu:=m_2/m_i$. See Eq. (5) above. At $\mu_c$, a pitchfork bifurcation occurs. With the decrease of $\mu$, the angles $\delta_{I,II}$ grows in magnitude until $D_1$ and $D_3$ reach their trivial antiparallel ground state when $\mu$ is zero (i.e., $D_2$ vanishes).

<IV. The Quadrupole—Dipole System>

Figure 11A:
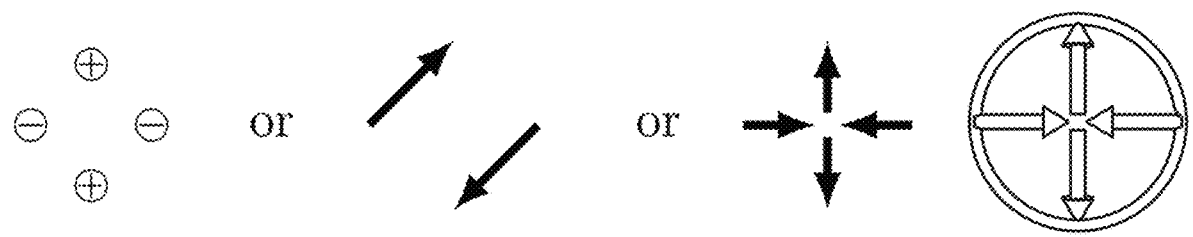
FIG. 11A corresponds to FIG. 7 in Article 1, and illustrates different ways to construct a point quadrupole. On the left, four monopoles of strength $\pm\sigma$ describing a square of area A are brought together ($A\to 0$) while $\sigma$ is increased such that the product $\sigma A$ stays finite. In the middle, two antiparallel dipoles are brought together. On the right, four dipoles are brought together.

An interesting generalization of the findings for two dipoles acting as gears involves higher multipole moments and combinations thereof. We consider the interaction between a quadrupole and a dipole, where the geometry is assumed as before: The rotation axes of the two objects lie in a common plane; the orientation of the quadrupole with respect to its rotation axis is analogous to the dipole in the sense that if one considers the quadrupole made up of four monopoles, these monopoles lie in the plane orthogonal to the rotation axis (FIG. 11A (corresponding to FIG. 7 in Article 1)). The interaction energy ($E_{QD}$) between a quadrupole at the origin and a dipole at position r is given in Eq. (7) of Article 1

$$\left(\text{i.e., } E_{QD} = \frac{2|r|^2(m^T Qr) - 5(m \cdot r)(r^T Qr)}{2|r|^7}, \right.$$

where Q is the quadrupole moment tensor, m is the dipole moment).

If we introduce the coordinate system analogous to FIG. 1, we again find a $\varphi$ for every $\theta$, which creates a CGS. The respective nonlinear condition is given by Eq. (8):

$$2\cos\theta \cos\varphi - 3\sin\theta \sin\varphi = 2. \quad (8)$$

Figure 11B:
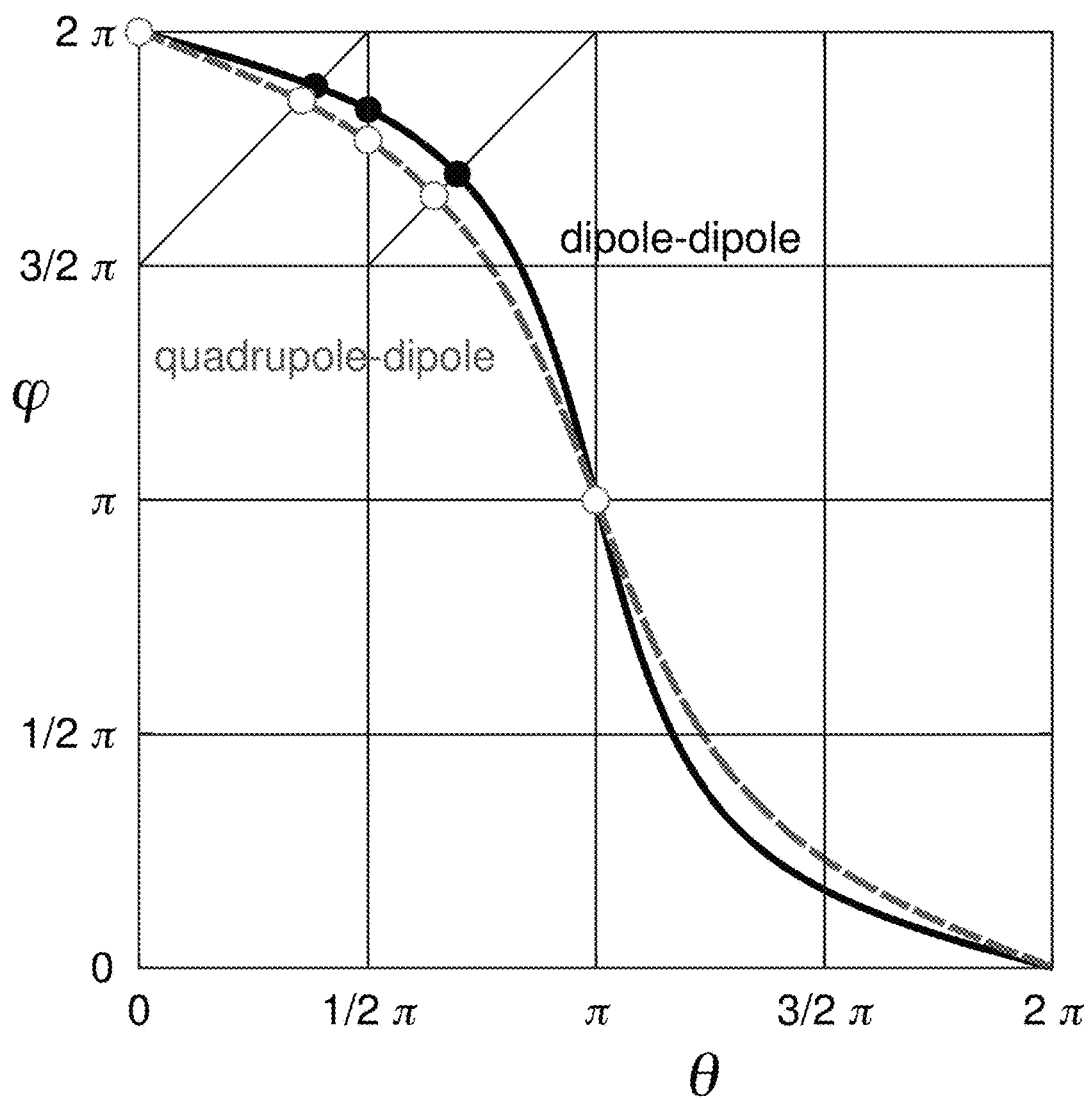
FIG. 11B corresponds to FIG. 8 in Article 1, and shows a graph of one branch of the relationship $2\cos\theta\cos\varphi - 3\sin\theta\sin\varphi = 2$ (darker line), where the angles $\theta$ and $\varphi$ define the rotation axes of the quadrupole-dipole system, which are illustrated in FIGS. 7B-7D and 8A-8F. For comparison, Equation (2), as disclosed in FIG. 6, for the dipole-dipole case is also shown in the graph (lighter line). The configurations from FIGS. 8A to 8E are marked with filled circles.

In contrast to the dipole-dipole case, this yields a gear ratio of 1:2. If a dipole is thought of as a gear with one "tooth" at the north pole and one "notch" at the south pole, a quadrupole is a gear with two teeth and two notches. When the dipole is rotated by a full cycle, the quadrupole rotated only half a cycle. The graph of one branch of relation according to Eq. (8) is shown in FIG. 11B (corresponding to FIG. 8 in Article 1). The explicit form of the interaction energy for the configurations obeying Eq. (8) is given by:

$$E_{QD} = -\frac{qm}{d^4}\sin\theta\cos(2\alpha - \beta), \quad (9)$$

where $E_{QD}$ is the interaction energy for the configurations obeying Eq. (8), q and m are the magnitudes of the quadrupole and dipole moment, respectively, and d is the distance between the two objects. The energy landscape according to Eq. (9) is depicted in FIG. 12 (corresponding to FIG. 9 in Article 1).

Figure 12:
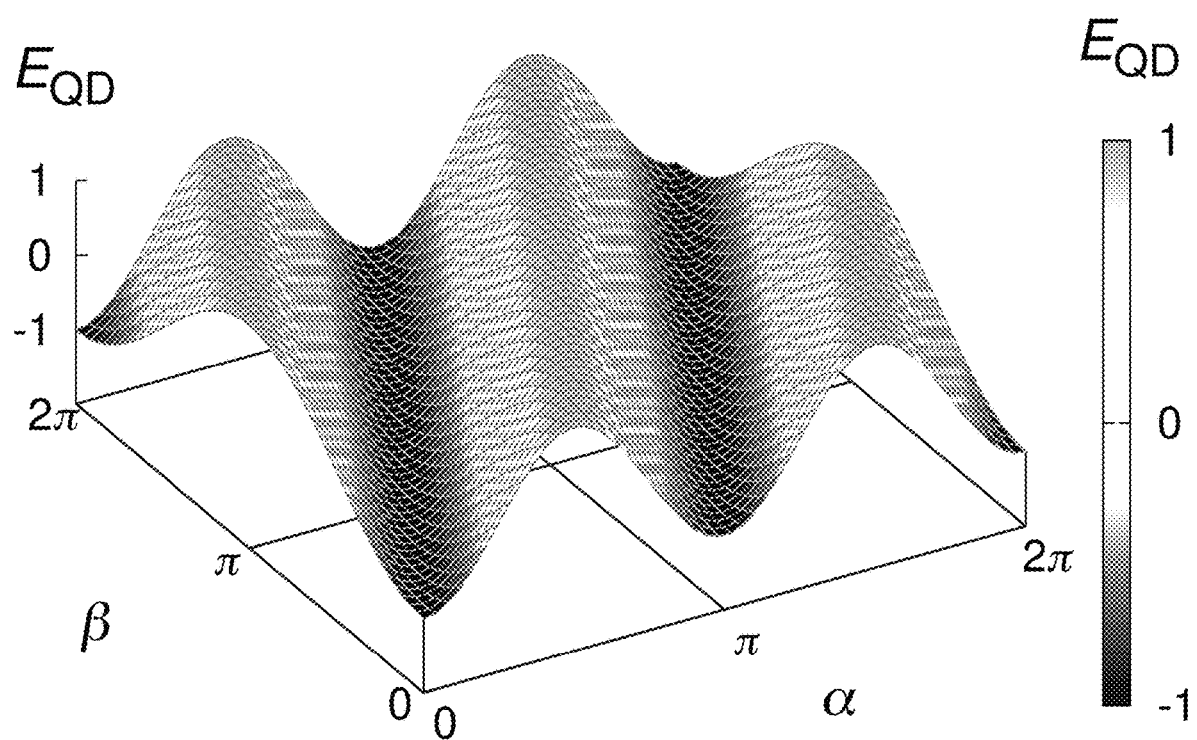
FIG. 12 corresponds to FIG. 9 in Article 1, and illustrates the degenerate energy landscape ($E_{QD}$) for the interaction of a quadrupole and a dipole ($q=m=d=1$, $\theta=\pi/2$) giving rise to a continuous ground state for $2\alpha=\beta$.

FIG. 12 (corresponding to FIG. 9 in Article 1) shows the degenerate energy landscape according to Eq. (9) for the interaction of a quadrupole and a dipoles (q=m=d=1, $\theta=\pi-/2$) giving rise to a continuous ground state for $2\alpha=\beta$.

The form of the energy according to Eq. (9) reflects the interesting effect that a quadrupole and a dipole do not "see" each other if the dipole is positioned anywhere along the rotation axis of the quadrupole, because this case corresponds to $\theta=0, \pi$ for which $E_{QD}=0$. This is a difference from the dipole-dipole case, where $E_2$ does not depend on $\theta$ or $\varphi$. As with the dipole systems discussed before, it is now possible to construct systems with more than one dipole or quadrupole. Again, for this to be a continuous state, each pair of multipoles has to form such a state. The possibilities are even more diverse now since we can construct systems where certain quadrupole-dipole pairs do not "see" each other (cf., above). Generally, it is an intriguing puzzle to find CGS for an increasing number of multipoles. A systematic strategy for doing so has not yet been proposed. One of many possible extensions is the inclusion of static (nonrotating) multipoles.

Although the main purpose of this paper is the introduction of a new gear concept based on a symmetry for multipole interactions, we comment on some technical aspects regarding the actual realization of the corresponding machines. The analysis relies on the assumption of ideal point multipoles. For the case of dipole systems, we can make use of the fact that a homogeneously magnetized sphere creates an outer field identical to a point dipole at the center of the sphere. Whether there exists an analogue principle for higher-order moments is an interesting question by itself: Is there a shape with a specific magnetization pattern which creates an outer field identical to a point quadrupole?

Regarding characteristics such as torque densities, the theoretical analysis for a concrete application is straightforward since the expressions for the interaction energies are readily given in analytical form.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A device for moving a fluid with magnetic gear, comprising:
    a first shaft that is configured to be rotatable;
    two first balls each having a shape of a first sphere, respectively fixed to the first shaft through a center of each first sphere, each of the first balls having a first magnetic dipole in a direction orthogonal to the first shaft and a center of each of the first magnetic dipoles coincides with the center of the corresponding first sphere through which the first shaft penetrates;
    a second shaft that is freely rotatable and that is disposed in parallel with the first shaft; and
    a second ball having a shape of a second sphere, fixed to the second shaft through a center of the second sphere of the second ball, the second ball having a second magnetic dipole in a direction orthogonal to the second shaft with a center of the second magnetic dipole coinciding with the center of the second sphere through which the second shaft penetrates,
    wherein the respective centers of the two first balls and the center of the second ball are arranged so as to form an isosceles triangle with a vertex angle being defined about the center of the second ball and satisfying $$\psi = 2\arcsin\left(\frac{1}{\sqrt{3}}\right) \approx 70.53°$$

and so that the two first balls and the second ball form a contactless magnetic gear, transmitting a rotational force of the first shaft to the second shaft, and
    wherein at least one of the second shaft and the second ball is physically connected to a blade structure that is placed in a passage of the fluid so that when the first shaft is rotated by an external driving force, the resulting rotation of the second shaft moves the fluid by said blade structure.

2. The device according to claim 1,
    wherein a magnitude $m_1$ of a dipole moment of each of the first magnetic dipoles of the two first balls and a magnitude $m_2$ of a dipole moment of the second magnetic dipole of the second ball satisfy:

$$\mu < \mu_c = \frac{3\sqrt{3}}{4} \approx 1.299,$$

wherein $\mu$ is a ratio of the magnitude $m_2$ of the dipole moment of the second magnetic dipole of the second ball to the magnitude $m_1$ of the dipole moment of each of the first agnetic dipoles of the two first balls, and is determined according to the equation: $\mu = m_2/m_1$, and $\mu_c$ is a critical ratio defined by the equation:

$$\mu_c = \frac{3\sqrt{3}}{4} \approx 1.299,$$

and
    wherein the two first balls are fixed to the first shaft such that an inclination angle $\delta$ of a direction of the first magnetic dipole of one of the two first balls relative to a direction of the first magnetic dipole of the second of the two first balls, as seen in a direction of the first shaft, satisfies:

$$\delta = \pm 2\arccos\frac{\mu}{\mu_c}.$$

3. A microfluidic device, comprising:
the microfluidic device body having a fluid channel for a fluid to pass through; and
the device as set forth in claim 2,
    wherein at least the second shaft and the second ball are installed within the microfluidic device body, and
    wherein a plurality of micro-blades is attached to the second ball, and the second shaft and the second ball with the plurality of micro-blades are disposed in the fluid channel so as to act as a micro-pump for pumping the fluid in the fluid channel.

4. The microfluidic device according to claim 3, wherein the first shaft and the two first balls are disposed external to the microfluidic device body.

5. A propulsion mechanism for a ship, comprising:
the device as set forth in claim 2; and
a driving device installed inside a hull of a ship for rotatably driving the first shaft,
    wherein the two first balls and the first shaft are disposed inside the hull of the ship, and
    wherein the second ball and the second shaft are disposed outside of the hull of the ship to make contact with water outside of the ship, and a propeller in contact with the water is attached to the second ball or the second shaft so that the propeller rotates in response to the rotation of the first shaft and causes the ship to move.

6. The device according to claim 1,
    wherein a magnitude $m_1$ of a dipole moment of each of the first magnetic dipoles of the two first balls and a magnitude $m_2$ of a dipole moment of the second magnetic dipole of the second ball satisfy:

$$\mu \geq \mu_c = \frac{3\sqrt{3}}{4} \approx 1.299,$$

wherein $\mu$ is a ratio of the magnitude $m_2$ of the dipole moment of the second magnetic dipole of the second ball to the magnitude $m_1$ of the dipole moment of each of the first magnetic dipoles of the two first balls, and is determined according to the equation: $\mu = m_2/m_1$, and $\mu_c$ is a critical ratio defined by the equation:

$$\mu_c = \frac{3\sqrt{3}}{4} \approx 1.299,$$

and
    wherein the two first balls are fixed to the first shaft such that the first magnetic dipoles of the two first balls are in parallel with each other, thereby making an inclination angle $\delta$ of a direction of the first magnetic dipole of one of the two first balls relative to a direction of the first magnetic dipole of the second of the two first balls, as seen in a direction of the first shaft, zero.

7. A microfluidic device, comprising:
a microfluidic device body having a fluid channel for a fluid to pass through; and the device as set forth in claim 6,
    wherein at least the second shaft and the second ball are installed within the microfluidic device body, and
    wherein a plurality of micro-blades is attached to the second ball, and the second shaft and the second ball with the plurality of micro-blades are disposed in the fluid channel so as to act as a micro-pump for pumping the fluid in the fluid channel.

8. The microfluidic device according to claim 7, wherein the first shaft and the two first balls are disposed external to the microfluidic device body.

9. A propulsion mechanism for a ship, comprising:
the device as set forth in claim 6; and
a driving device installed inside a hull of a ship for rotatably driving the first shaft,
    wherein the two first balls and the first shaft are disposed inside the hull of the ship, and
    wherein the second ball and the second shaft are disposed outside of the hull of the ship to make contact with water outside of the ship, and a propeller in contact with the water is attached to the second ball or the second shaft so that the propeller rotates in response to the rotation of the first shaft and causes the ship to move.

10. A microfluidic device, comprising:
a microfluidic device body having a fluid channel for a fluid to pass through; and
the device as set forth in claim 1,
wherein at least the second shaft and the second ball are installed within the microfluidic device body, and
wherein a plurality of micro-blades is attached to the second ball, and the second shaft and the second ball with the plurality of micro-blades are disposed in the fluid channel so as to act as a micro-pump for pumping the fluid in the fluid channel.

11. The microfluidic device according to claim 10, wherein the first shaft and the two first balls are disposed external to the microfluidic device body.

12. A propulsion mechanism for a ship, comprising:
the device as set forth in claim 1; and
a driving device installed inside a hull of a ship for rotatably driving the first shaft,
wherein the two first balls and the first shaft are disposed inside the hull of the ship, and
wherein the second ball and the second shaft are disposed outside of the hull of the ship to make contact with water outside of the ship, and a propeller in contact with the water is attached to the second ball or the second shaft so that the propeller rotates in response to the rotation of the first shaft and causes the ship to move.

13. A device for moving a fluid with magnetic gear, comprising:
a first shaft that is configured to be rotatable;
two first magnetic dipoles respectively orthogonally fixed to the first shaft through respective centers of the two first magnetic dipoles;
a second shaft that is freely rotatable and that is disposed in parallel with the first shaft; and
a second magnetic dipole orthogonally fixed to the second shaft through a center of the second magnetic dipole,
wherein the respective centers of the two first magnetic dipoles and the center of the second magnetic dipole are arranged so as to form an isosceles triangle with a vertex angle $\psi$ being defined about a center of the second ball and satisfying $$\psi = 2\arcsin\left(\frac{1}{\sqrt{3}}\right) \approx 70.53°$$

and so that the two first magnetic dipoles and the second magnetic dipole form a contactless magnetic gear, transmitting a rotational force of the first shaft to the second shaft, and
wherein at least one of the second shaft and the second magnetic dipole is physically connected to a blade structure that is placed in a passage of the fluid so that when the first shaft is rotated by an external driving force, the resulting rotation of the second shaft moves the fluid by said blade structure.

* * * * *